460-71 EX
M7843 OR X 9,768
9768X
P. CLEAVELAND.
THRESHING MACHINE.
Patented June 25, 1836.
*Fig 1.*
*Toothed cylinder.*
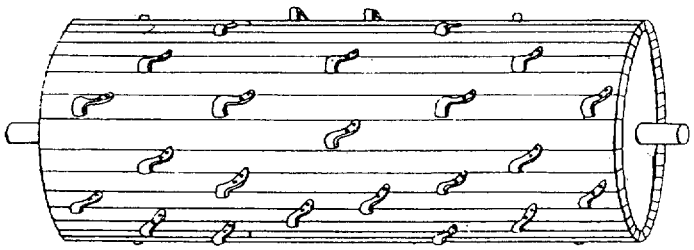
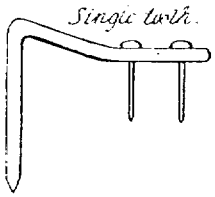
*Fig 2.*
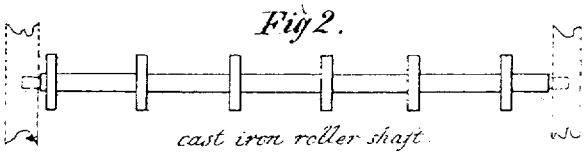
*cast iron roller shaft.*
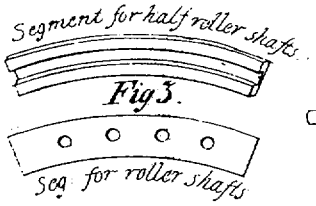
*Fig 4.*
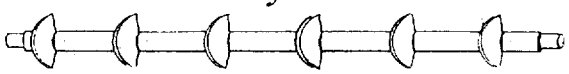
*Half roller shaft.*
*Fig 5.*
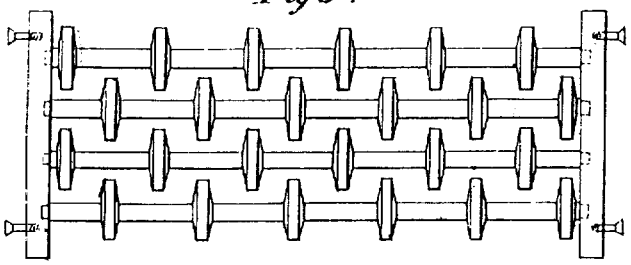
*Concave bed of roller shafts.*
Witnesses
Elijah Johnson
Joseph H. Herndon.
Porter Cleaveland June 25, 1836 9768X [illegible]

Porter Cleaveland Co of Albemarle and State of Virginia

Letters Patent

The schedule referred to in these Letters Patent and making part of the same, containing a description in the words of the said Porter Cleaveland himself of his improvement in the thrashing Machine

---

To all, to whom these Presents, shall come

Be it known that I Porter Cleaveland in the county of Albemarle and State of Virginia have invented a new useful and durable improvement in Machinery for thrashing small grain of every description, called Cleaveland's rotary roller shaft and half roller shaft thrashing machine for thrashing wheat and other small grain from off the straw, which machine and its manner of use are as follows Viz.

This machine is constructed by having a frame, three feet long by two feet nine inches from out to out more or less, according to the power required to give it motion. The frame may be made of any suitable materials consisting of four posts two feet and a half long, four and a half inch by three inch. into these posts are framed with double tenons two side girders fourteen inch wide by three inches thick, and four other girders three and a half inch by three inch. are framed into said posts which make the ends of the frame, on the top of these posts are put two caps of timber three and a half inch by three inch. extending 4 inch beyond each end of the frame.

On the said girders of the frame is placed a cylinder [illegible] 2 feet 3 inch long and 15 inch in diameter constructed as follows. On a shaft of iron 1 1/2 inch square of suitable length for the frame are placed two wooden heads 2 inch thick, turned round of sufficient diameter to receive staves 3 inch thick so as to give the full diameter of 15 inch to the cylinder. In this cylinder are placed 76 or more or less brace and nailed teeth in proportion to its length which are placed in the Cylinder at suitable distance from each other, either in spiral, half spiral or straight rows, at the option of the builder so as to have 4 or more teeth in a row round the Cylinder – This tooth is made as follows, of wrought iron 3/8 of an inch square bent in an angular form having one prong straight, which is driven 3 inch.s into the Cylinder leaving it 1 1/4 inch out – The other end or prong forms a curved Brace of 5 or more inch.s long through which are driven into the Cylinder two large nails as seen in fig, 6.th The concave bed is made or constructed of cast iron roller shafts 2 feet 3 inch.s long – The rollers 4 inch.s in diameter 3/8 of an inch thick at the outer edge and 1/2 inch thick where it becomes solid with the shaft; the solid part of the shaft 1 1/2 inch. in diameter more or less The rollers are 2 1/2 inch.s apart from centre to centre as in fig 2.

Circular Segments of cast iron are made 3 inch.s wide and 1 inch thick of sufficient length with holes 1 inch in diameter so as to receive five more or less roller shafts at a proper distance to roll without touching each other as in fig. 3.rd 5. roller shafts are put alternately in the circular segments as in fig 4.th and then placed in the frame at proper distance from the cylinder and the segments screwed fast to the side girders.

The rollers may be either smooth on the outer edge or notched at the option of the builder, notches on the edge will give them more motion –

The roller shaft may be left out in this concave bed and the half circle or half roller shaft before named, used in its stead. The half roller shaft is made in the form of half of the roller shaft as in fig. 5. this is placed in the frame by being screwed to a wooden concave bed which is let into the side girders by means of circular groove cut in the girders –

What I claim as my invention and improvement is the Brace and nailed tooth in the Cylinder, the roller shaft, and the half circle or half roller shaft in the concave bed and the manner & form in which the concave bed is put together as above described for the aforesaid purposes –

9768X 479

Witnesses
Elijah Johnson
Joseph H. Herndon.

Porter Cleveland

Exr
479

819 w 05]

Drawing